US008670883B2

(12) United States Patent
Takagi

(10) Patent No.: US 8,670,883 B2
(45) Date of Patent: Mar. 11, 2014

(54) TRAIN SPEED CONTROL APPARATUS AND TRAIN SPEED CONTROL METHOD

(75) Inventor: Masamichi Takagi, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/634,307

(22) PCT Filed: Apr. 28, 2010

(86) PCT No.: PCT/JP2010/003055
§ 371 (c)(1),
(2), (4) Date: Sep. 12, 2012

(87) PCT Pub. No.: WO2011/135626
PCT Pub. Date: Nov. 3, 2011

(65) Prior Publication Data
US 2013/0006452 A1    Jan. 3, 2013

(51) Int. Cl.
*G05D 1/00*    (2006.01)

(52) U.S. Cl.
USPC ........................................................... 701/20

(58) Field of Classification Search
USPC ................................................... 701/20
See application file for complete search history.

(56) References Cited

U.S. PATENT DOCUMENTS

| 2004/0143374 | A1* | 7/2004 | Horst et al. | 701/19 |
| 2009/0125170 | A1* | 5/2009 | Noffsinger et al. | 701/20 |
| 2010/0241296 | A1* | 9/2010 | Rhea et al. | 701/20 |

FOREIGN PATENT DOCUMENTS

| JP | 2005-014785 A | 1/2005 |
| JP | 2006-136041 A | 5/2006 |
| JP | 2009-055694 A | 3/2009 |

OTHER PUBLICATIONS

International Search Report (PCT/ISA/210) issued on Aug. 10, 2010, by the Japanese Patent Office as the International Searching Authority for International Application No. PCT/JP2010/003055.
Written Opinion (PCT/ISA/237) issued on Aug. 10, 2010, by the Japanese Patent Office as the International Searching Authority for International Application No. PCT/JP2010/003055.
Office Action from the Japan Patent Office dated Jul. 23, 2013, issued in corresponding Japanese Patent Application No. 2012-512537, with English translation thereof. (4 pages).

* cited by examiner

*Primary Examiner* — James Trammell
*Assistant Examiner* — Michael D Lang
(74) *Attorney, Agent, or Firm* — Buchanan Ingersoll & Rooney PC

(57) ABSTRACT

To stop a train at a desired target stop position without outputting excessive brake by outputting an appropriate braking instruction in accordance with a running condition of the train. An on-train computing device causes an acceleration estimating unit to determine the presence/absence of a current acceleration of a train and to estimate the current acceleration based on train-car information obtained from a train-car performance manager unit, and causes a profile calculating unit to generate a braking instruction profile based on a presumption that the train is running at the current acceleration when the train is in an accelerating condition, and to generate the braking instruction profile based on a presumption that there is no acceleration applied to a train car of the train by a propulsion control of the train car itself when the train is in a coasting condition.

13 Claims, 9 Drawing Sheets

| SPEED[km/h] 61 | ACCELERATION[km/h/s] 62 |
|---|---|
| 0 | 3.50 |
| 5 | 3.50 |
| 10 | 3.50 |
| 15 | 3.50 |
| 20 | 3.50 |
| 25 | 3.50 |
| 30 | 3.50 |
| 35 | 3.50 |
| 40 | 3.50 |
| 45 | 2.77 |
| 50 | 2.24 |
| 55 | 1.85 |
| 60 | 1.56 |
| 65 | 1.33 |
| 70 | 1.14 |
| 75 | 1.00 |

TRAIN SPEED CONTROL APPARATUS AND TRAIN SPEED CONTROL METHOD

TECHNICAL FIELD

The present invention relates to a train speed control apparatus and a train speed control method, and more specifically, to a train speed control apparatus and a train speed control method which generate a braking profile for a train based on a running position of the train and which control the speed thereof.

BACKGROUND ART

ATC (Automatic Train Control) and ATP (Automatic Train Protection) used in railroad safety systems include a profiled train speed control apparatus which generates a braking instruction profile in accordance with a train-car performance ahead of a movement authority limit like a signal, and which automatically activates brakes when the speed exceeds such a profile to stop the train before the movement authority limit.

Information on the movement authority limit is transmitted to an on-train control apparatus through a track circuit, a beacon, and a wireless device, etc. The on-train control apparatus generates a braking instruction profile based on such information, the train-car performance and gradient information, etc.

In the case of a train, there is an idle running time of several seconds until actual deceleration starts after a braking instruction is output. Hence, the braking instruction profile must be generated in consideration of the idle running time. If such an idle run is out of consideration, the train may overrun the movement authority limit.

Patent Literature 1 discloses a train speed control apparatus which generates a train deceleration profile based on a gradient and the braking performance of a train, and uses a braking instruction profile that is a curvature shifted ahead from the deceleration profile by a running distance during an idle running time period based on a presumption that the train accelerates during the idle running time period in accordance with a railway track condition and a power-running instruction.

Note that power running means to transmit power to a driving device of a train, and when a power-running instruction is given, the train accelerates.

PRIOR ART LITERATURE

Patent Literature

Patent Literature 1: Unexamined Japanese Patent Application KOKAI Publication No. 2009-55694 (see paragraphs 0024 to 0028 and FIG. 3).

DISCLOSURE OF INVENTION

Problems to be Solved by the Invention

According to the above-explained conventional train speed control apparatus, however, even when the train is accelerating in response to a power-running instruction during an idle running time period until a braking instruction is given, a certain numeric value is assigned as an acceleration rate used for an arithmetic processing. Accordingly, the train accelerates at an acceleration exceeding the certain numeric value until the braking starts to act on the train, and thus the train may overrun the movement authority limit.

Moreover, even if the acceleration of the power running is in consideration, when a braking instruction is output during the running other than the power running, the brakes are activated so that the train may stop ahead of the necessary movement authority limit.

The present invention has been made in order to address the above-explained technical issues, and it is an object of the present invention to provide a train speed control apparatus and a train speed control method which can stop a train at a desired target stop potion without excessively activating brakes by outputting an appropriate braking instruction in accordance with a running condition of the train.

Means for Solving the Problems

A train speed control apparatus according to the present invention includes: a receiver unit that receives a current position of a running train and train position information including a target position; a speed obtaining unit that obtains a current speed of the train; an acceleration estimating unit that estimates a current acceleration of the train; a braking device that controls a brake of the train in response to a braking instruction; a memory unit that stores train-car information including a stopping distance in accordance with a speed of the train; a computing unit which generates a target deceleration profile based on a remaining travel distance to the target position obtained from the train position information and the stopping distance in accordance with the current speed obtained from the train-car information, and which generates a braking instruction profile by computing a travel distance of the train during an idle running period of the brake in accordance with the current acceleration obtained by the acceleration estimating unit and a speed change based on the target deceleration profile when the braking instruction is output; and a speed checking unit that outputs the braking instruction to the braking device when the current speed exceeds a speed at the current position in the braking instruction profile.

A train speed control method according to the present invention includes steps of: obtaining a current position of a running train and train position information including a target position; generating a target deceleration profile based on a remaining travel distance to the target position obtained from the train position information and a stopping distance in accordance with a current speed obtained from train-car information of the train; computing, based on the target deceleration profile, a travel distance of the train and a speed change in an idle running time period of a brake in accordance with a current acceleration obtained when a braking instruction is output to generate a braking instruction profile; and outputting the braking instruction when the current speed exceeds a speed at the current position in the braking instruction profile.

Effects of the Invention

According to the present invention, the braking instruction profile is generated by computing the travel distance of the train and the acceleration change in a braking idle running period in accordance with the current speed obtained when the braking instruction is output. Hence, when the train is accelerating or is not accelerating during an idle running period, the braking instruction in accordance with the running condition of the train can be output, and thus the train can stop without overrunning the movement authority limit.

MODE FOR CARRYING OUT THE INVENTION

An explanation will be given of train speed control apparatuses according to respective embodiments of the present invention with reference to the accompanying drawings.

First Embodiment

Figure 1:
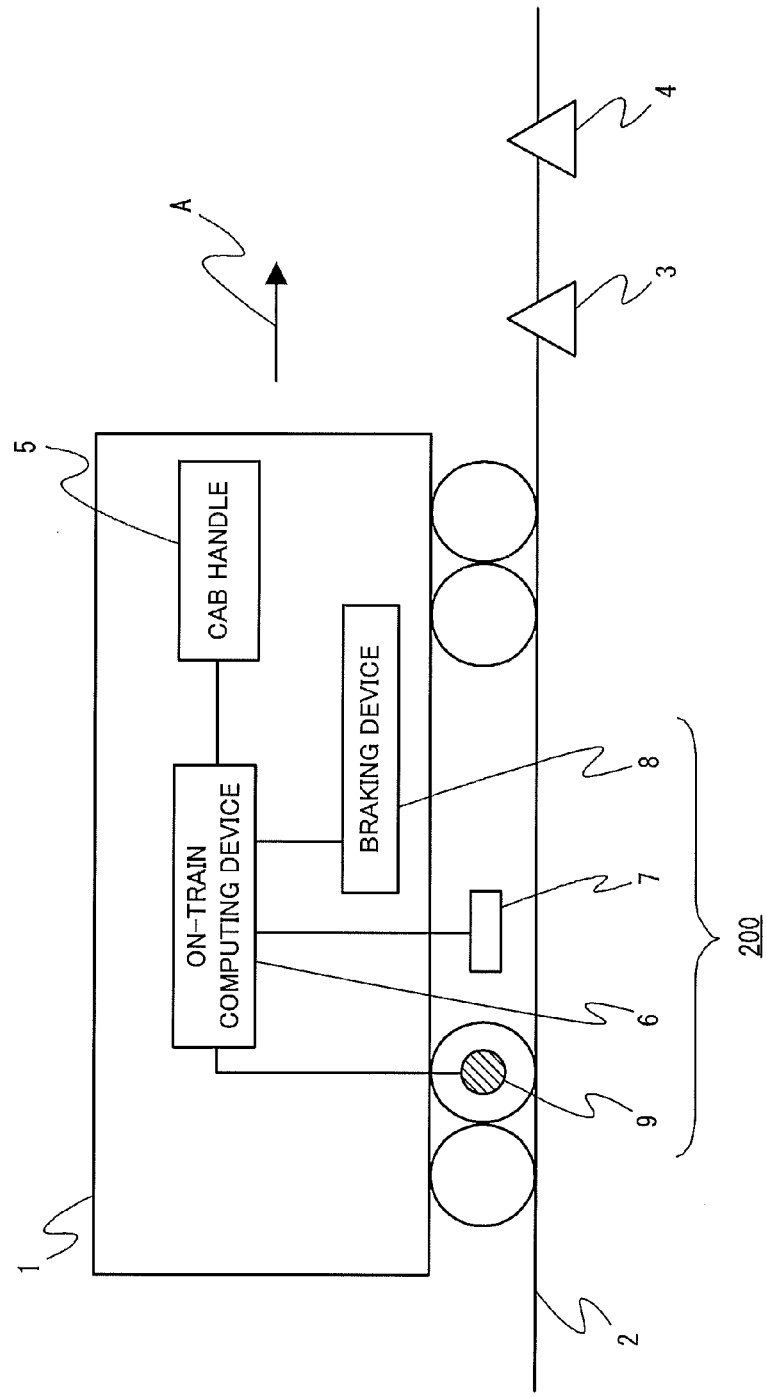
FIG. 1 is a configuration diagram showing a configuration of a train speed control apparatus according to a first embodiment of the present invention.

FIG. 1 is a configuration diagram showing a whole configuration of a train speed control apparatus according to a first embodiment of the present invention.

In FIG. 1, a train speed control apparatus 200 is loaded on a train 1, and includes a cab handle 5, an on-train computing device 6, a transponder type on-train beacon unit 7, a braking device 8; and a tacho-generator 9.

The train 1 runs on a track 2 in a direction A, and provided on the track 2 are a plurality of transponder type stopping position notifying beacons 3 and transponder type position correction beacons 4 for transmitting train position information that is movement authority limit (a target position) and position correction (a current position), respectively.

The train speed control apparatus 200 obtains, when the train 1 passes through over the stopping position notifying beacon 3, a movement authority limit from the stopping position notifying beacon 3 through the on-train beacon unit 7. Moreover, the train speed control apparatus 200 obtains, when the train 1 passes through over the position correction beacon 4, a position correction beacon position from the position correction beacon 4 through the on-train beacon unit 7.

The on-train beacon unit 7 that is a receiver notifies the on-train computing device 6 of the obtained movement authority limit and the position correction beacon position. The cab handle 5 that is power-running notch input means notifies the on-train computing device 6 of notch input information that indicates the presence/absence of a power running notch input. The tacho-generator 9 that is a speed obtaining unit generates a wheel-rotating-speed signal corresponding to the rotating speed of a wheel and outputs such a signal to the on-train computing device 6.

The on-train computing device 6 obtains a current train position from the position correction beacon position from the on-train beacon unit 7 and the wheel rotating speed from the tacho-generator 9, generates a braking instruction profile based on geographical information in accordance with the current train position, and train-car information in accordance with the notch input information from the cab handle 5, and outputs a braking instruction to the braking device 8. The braking device 8 decelerates the train 1 at a predetermined deceleration in response to the input braking instruction.

The geographical information includes geographical condition data such as respective positions along a train line and gradient data corresponding to each position, etc. Moreover, the train-car information includes train-car performance data that is a deceleration performance of the train 1, the overall length thereof, and an idle running time, etc.

Figure 2:
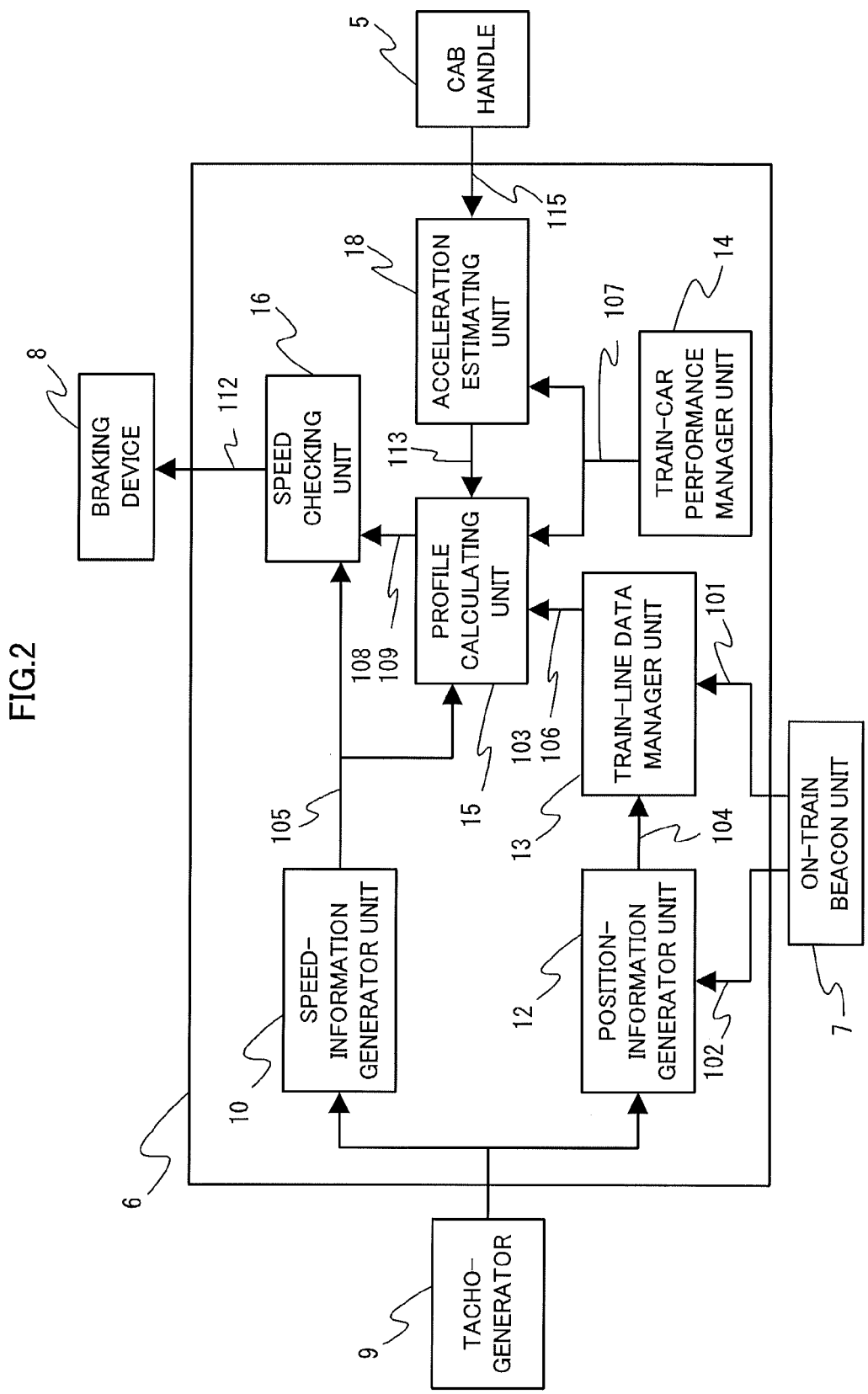
FIG. 2 is a block diagram showing a configuration of an on-train computing device of the train speed control apparatus according to the first embodiment of the present invention.

FIG. 2 is a block diagram showing a configuration of the on-train computing device 6 of the train speed control apparatus 200 according to the first embodiment of the present invention. In FIG. 2, the on-train computing device 6 includes a speed-information generator unit 10, a position-information generator unit 12, a train-line data manager unit 13, a train-car performance manager unit 14, an acceleration estimating unit 18, a profile calculating unit 15, and a speed checking unit 16.

The speed-information generator unit 10 counts the signals (the wheel-rotating-speed signals) output by the tacho-generator 9 in accordance with the rotating speed of the wheel to calculate a current train speed 105 that is a current speed of the train 1, and transmits the calculated speed as train speed information to the speed checking unit 16.

The position-information generator unit 12 adds a travel distance (a cumulative distance) obtained by counting the wheel-rotating-speed signals from the tacho-generator 9 after the notification of a position correction beacon position 102 to the position correction beacon position 102 notified from the position correction beacon 4 through the on-train beacon unit 7 to calculate a current train position 104 that is a current position of the train 1, and transmits the calculated current position to the train-line data manager unit 13.

The train-line data manager unit 13 outputs geographical information 106 including a distance from the current train position 104 to a movement authority limit 101, i.e., a remaining travel distance 103, and gradient data at an interval ahead of the movement authority limit 101, etc., and generated based on the current train position 104 notified from the position-information generator unit 12 and the movement authority limit 101 notified from the on-train beacon unit 7 to the profile calculating unit 15.

The train-line data manager unit 13 obtains and retains, in advance before running, geographical information including respective positions along the train line and gradient data corresponding to each position, etc., in a memory unit.

The acceleration estimating unit 18 obtains train-car information 107 including train-car performance data in accordance with notch input information 115 output by the cab handle 5 from the train-car performance manager unit 14.

Moreover, the acceleration estimating unit 18 estimates a current acceleration 113 of the train 1 applied to a train car of the train 1 by a propulsion control device (unillustrated) of the train car itself during a certain time from the present time based on the obtained train-car information 107, and outputs the estimated current speed to the profile calculating unit 15.

The train-car performance manager unit 14 obtains and retains, in advance before running, train-car information including the deceleration performance of the train 1, the overall length thereof, an idle running time, and acceleration data corresponding to a speed at a power running notch position, etc., in a memory unit.

The profile calculating unit 15 generates a target deceleration profile 109 indicated by the speed of the train and the remaining travel distance from the remaining travel distance 103 output by the train-line data manager unit 13, and the train-car information 107 including the train performance data, etc., output by the train-car performance manager unit 14.

Moreover, the profile calculating unit 15 calculates a speed change 111 from a braking idle running time of the train 1 obtained from the train-car information 107, the current acceleration 113 of the train 1 obtained from the acceleration estimating unit 18, and the geographical information 106 including the gradient data, etc., obtained from the train-line data manager unit 13, and calculates a travel distance 110 from the current speed 105 of the train 1 obtained from the speed-information generator unit 10, the speed change 111, and an idle running time.

Furthermore, the profile calculating unit 15 generates a braking instruction profile 108 in accordance with the calculated and obtained speed change 111 and travel distance 110 in the idle running time based on the target deceleration profile 109, and outputs the generated profile to the speed checking unit 16.

The speed checking unit 16 compares the current speed 105 of the train 1 with the braking instruction profile 108 generated by the profile calculating unit 15. More specifically, a speed corresponding to the current train position 104 is obtained based on the braking instruction profile 108, and the obtained speed is compared with the current speed 105 of the train 1.

When the current speed 105 of the train 1 exceeds the speed obtained based on the braking instruction profile 108, a braking instruction 112 is given to the braking device 8.

Figure 3:
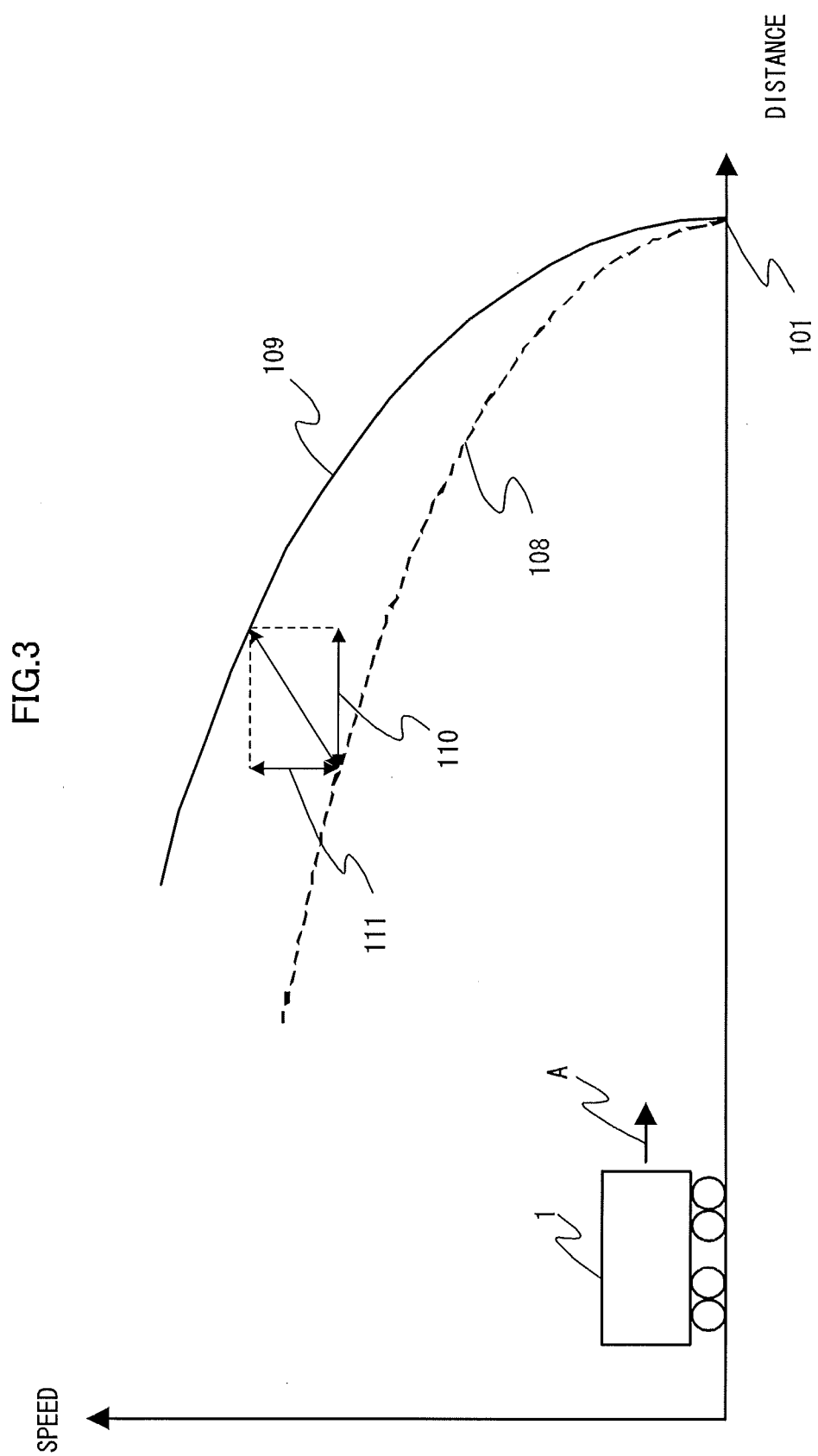
FIG. 3 is a graph showing a control operation by the on-train computing device of the train speed control apparatus according to the first embodiment of the present invention.

FIG. 3 is a graph showing a relationship between the target deceleration profile 109 and the braking instruction profile 108 generated by the profile calculating unit 15. In FIG. 3, the target deceleration profile 109 indicates a travel track of the train 1 until the train stops after starting deceleration after an idle running time period has elapsed.

For example, it is presumed that there is no gradient information in an interval from the stopping position notifying beacon 3 to the movement authority limit 101, the train braking performance does not depend on the train speed, a deceleration β [km/h/s] is constant, and the effects of air resistance and curving line (a curve) resistance can be ignorable. In this case, the relationship between a remaining travel distance d [m] and a speed V(d) [km/h] corresponding to such remaining travel distance can be expressed by, for example, the following formula (1).

[Formula 1]

$$V(d) = \sqrt{7.2d\beta} \tag{1}$$

As explained above, it takes time until a predetermined deceleration β is generated after the braking device 8 is actually activated for braking by what corresponds to the idle running time period. Hence, according to the first embodiment, when braking is activated during the execution of the power running instruction of the train 1, the braking instruction profile 108 is calculated based on an assumption that the train 1 is accelerating by the train's current acceleration 113 estimated by the acceleration estimating unit 18 during the idle running time period.

The braking instruction profile 108 becomes a curve which is shifted ahead (in FIG. 3, in the left direction) by the travel distance 110 in the idle running time period from each point over the target deceleration profile 109 in consideration of the current acceleration 113 of the train 1 at such a point, and which interconnects points subtracted by the speed change 111 in the idle running time period (in FIG. 3, shifted downwardly), i.e., a curve that is the target deceleration profile 109 subjected to subtraction and shifted inwardly by what corresponds to the travel distance 110 and the speed change 111 in the idle running.

When, for example, N number of points are plotted on the target deceleration profile 109 in FIG. 3, remaining travel distances d1, d2, ... and dN, and speeds V1, V2, ... and VN are defined at respective points. A remaining travel distance d'n and a speed V'n when the running track (the travel distance 110 and the speed change 111) in an idle running time T [s] is subtracted with respect to a remaining travel distance do and a speed Vn at an arbitrary point based on a presumption that the train 1 is accelerating at a current train acceleration α [km/h/s] can be expressed by the following formulae (2) and (3), respectively.

[Formula 2]

$$V' = V + \alpha T \tag{2}$$

[Formula 3]

$$d' = d + \frac{VT}{3.6} + \frac{\alpha T^2}{7.2} \tag{3}$$

When the train 1 is in a condition not dominant by a power running instruction, the train 1 is in a coasting condition during the idle running time period, and the braking instruction profile 108 is calculated based on a presumption that the train 1 is not accelerating but is running at an equal speed during the idle running time period.

In this case, in the above-explained formulae (2) and (3), with the current train acceleration α=0, the following formulae (4) and (5) are used.

[Formula 4]

$$V' = V \tag{4}$$

[Formula 5]

$$d' = d + \frac{VT}{3.6} \tag{5}$$

However, since the propulsion control device of the train continues acceleration during a certain time period determined by the train characteristics after the train 1 completes the power running instruction, the acceleration estimating unit 18 estimates the current acceleration 113 of the train 1 based on a presumption that the train is being subjected to power running during a certain time period after the completion of the power running instruction.

When the train is accelerating at a time point at which the braking device 8 is activated for braking, the braking instruction profile 108 is calculated using the above-explained formulae (2) and (3) based on a presumption that the train 1 is accelerating at the current acceleration 113.

Hence, when determining that the train 1 is in an acceleration condition based on the current acceleration 113 of the train 1 estimated by the acceleration estimating unit 18 in accordance with a train-car information 107 obtained from the train-car performance manager unit 14 depending on the notch input information 115, the on-train computing device 6 generates the braking instruction profile 108 based on a presumption that the train is running at a certain acceleration during a braking idle running time period, and when determining that the train is in a coasting condition, the on-train computing device 6 generates the braking instruction profile 108 based on the presumption that the train is running at a constant speed.

Accordingly, in the train speed control apparatus 200 of the first embodiment of the present invention, the on-train computing device 6 determines the presence/absence of the current acceleration 113 of the train 1 through the acceleration estimating unit 18 to output a braking instruction in accordance with the running condition of the train, and thus the train can stop without overrunning the movement authority limit.

In the above-explained embodiment, the explanation was given of the case in which there are no gradient, air resistance and a curved line (a curve) resistance, but at the time of calculation of the target deceleration profile 109 and the braking instruction profile 108, a change in the deceleration due to a gradient, a miming resistance due to a curve or a tunnel, or the air resistance of the train, etc., may be considered as needed, and a more precise braking instruction profile 108 can be generated by using a constant corresponding to the gradient, the curve, or the air resistance, etc., for the calculation.

In this case, the positions of the gradient, the curve, and the tunnel are retained by the train-line data manager unit 13, and the constants corresponding to the gradient, the curve, and the air resistance used for the calculation of the acceleration are retained by the train-car performance manager unit 14.

Figure 4:
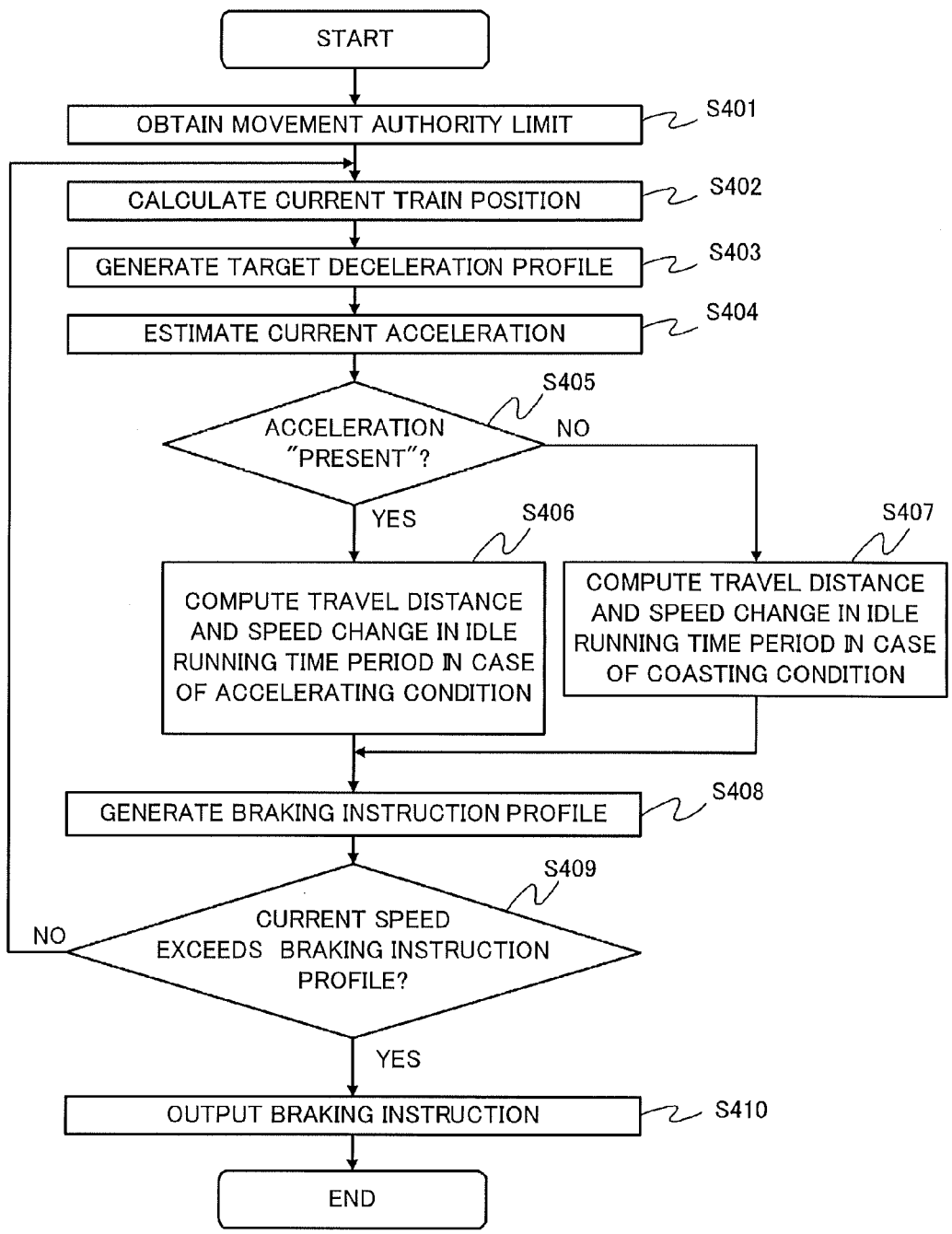
FIG. 4 is a flowchart showing a procedure of an operation of the train speed control apparatus according to the first embodiment of the present invention.

Next, with reference to the flowchart of FIG. 4, an explanation will be given of an operation of the train speed control apparatus 200 according to the first embodiment. First, when the train 1 passes through over the stopping position notifying beacon 3, the on-train computing device 6 obtains the movement authority limit 101 from the stopping position notifying beacon 3 through the on-train beacon unit 7 (S401).

Next, when the train 1 passes through over the position correction beacon 4, the on-train computing device 6 obtains the position correction beacon position 102 from the position correction beacon 4 through the on-train beacon unit 7, and causes the position-information generator unit 12 to add the travel distance obtained by the tacho-generator 9 to the position correction beacon position 102, thereby calculating the current train position 104 of the train 1 (S402).

Next, the on-train computing device 6 causes the train-line data manager unit 13 to output a distance from the current train position 104 to the movement authority limit 101, i.e., the remaining travel distance 103 based on the current train position 104 and the movement authority limit 101, and the geographical information 106 like gradient data in an interval ahead of the movement authority limit 101, and causes the profile calculating unit 15 to generate the target deceleration profile 109 represented by the speed of the train and the remaining travel distance based on the remaining travel distance 103, the geographical information 106, and the train-car information 107 including the train performance data, etc., output by the train-car performance manager unit 14 (S403).

Moreover, the on-train computing device 6 obtains the train-car information 107 like the train performance data in accordance with the notch input information 115 from the cab handle 5 from the train-car performance manager unit 14, and causes the acceleration estimating unit 18 to estimate the current acceleration 113 of the train 1 given to the train car of the train 1 by the propulsion control device of the train car itself during a certain time from the present time based on the obtained train-car information 107 (S404).

Figure 5:
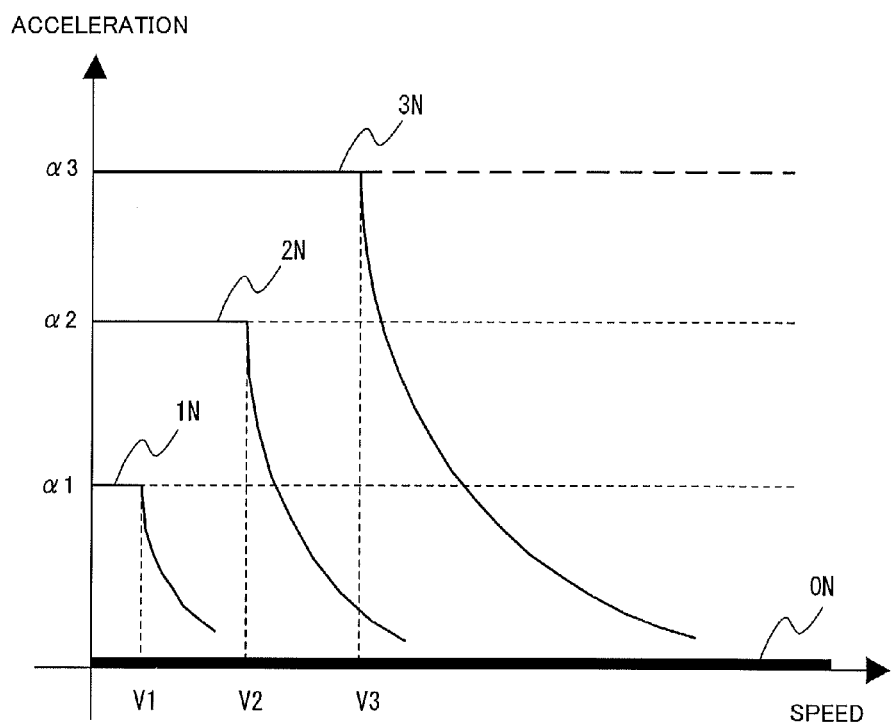
FIG. 5 is a graph showing a relationship between a power running notch of a train and an acceleration thereof using the train speed control apparatus according to the first embodiment of the present invention.

FIG. 5 is a graph showing a relationship between a speed and an acceleration at each notch position in the power running notch inputting of the train 1. FIG. 5 shows a case in which power running notch positions N of the train 1 are changed among three stages of intensity from 1N to 3N.

As shown in FIG. 5, because of its physical characteristics, a motor decreases torque when a speed increases with an applied voltage being constant. Hence, in the case of a motor control for a train, in general, a voltage is increased in accordance with a speed so that the train-car acceleration becomes constant up to a certain speed, and a maximum voltage is continuously applied to the motor after a motor applied voltage reaches a maximum value. In this condition, when the speed exceeds a certain speed, the motor decreases torque in accordance with the speed.

According to the train 1, the power running notch inputting from the cab handle 5 is set to be 1N, when the speed of the train 1 reaches V1, the power running notch inputting is changed to 2N, and when the speed reaches V2, the power running notch inputting is changed to 3N. With the power running notch inputting being 3N, when the speed reaches V3, torque starts decreasing and the train becomes a coasting condition (0N).

The train-car performance manager unit 14 stores in advance a relationship between a speed and an acceleration corresponding to each notch position of the train 1 as the train-car information 107 in the train performance data. FIG. 6 shows an illustrative structure of the train performance data stored by the train-car performance manager unit 14.

Figures 6A, 6B:
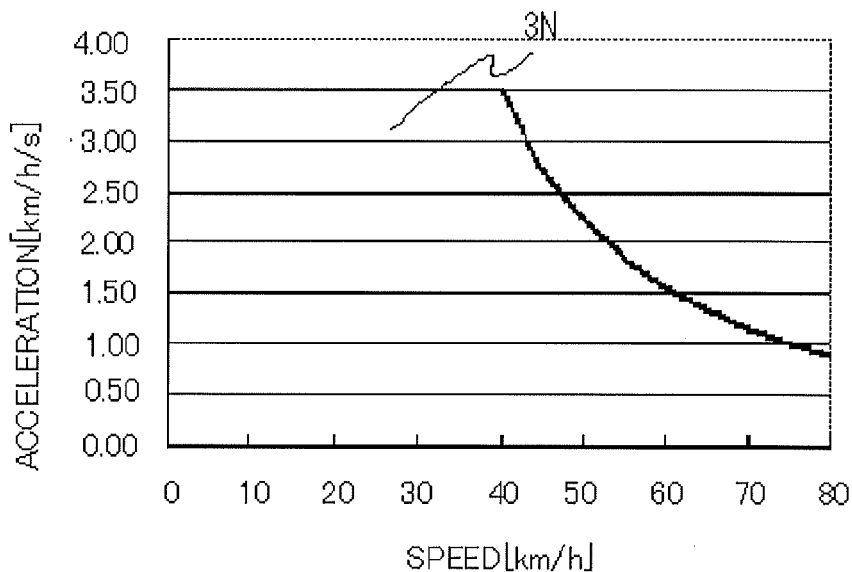
FIG. 6 shows example train-car performance data of the train speed control apparatus according to the first embodiment of the present invention.

For example, a relationship between a speed and an acceleration with the power running notch inputting being 3N shown in FIG. 6A is stored in advance by the train-car performance manager unit 14 as the train performance data of an acceleration 62 corresponding to a speed 61 per an hour of the train 1 with the power running notch inputting being 3N as shown in FIG. 6B.

When the notch input information 115 indicates in S404 that the power running notch is input into any one of the stages, the on-train computing device 6 determines through the acceleration estimating unit 18 that the acceleration of the train 1 is "present", obtains the maximum acceleration at the maximum intensity of notch inputting of the train 1 from the train-car information 107 in the train-car performance manager unit 14 in such a way that the train does not overrun the movement authority limit 101, and outputs the obtained acceleration as the current acceleration 113 of the train 1 (S405).

When, for example, the power running notch N of the train 1 shown in FIG. 5 as the train-car information 107 has the three stages of intensity from 1N to 3N, the acceleration estimating unit 18 obtains, as the maximum acceleration of the train 1, $\alpha 3=3.50$ [km/h/s] from the train performance data (see FIG. 6B) when the notch inputting is 3N that is the maximum intensity in the train-car performance manager unit 14, and outputs the obtained acceleration as the current acceleration 113 of the train 1.

The on-train computing device 6 causes the profile calculating unit 15 to calculate the travel distance 110 and the speed change 111 based on the current speed 105 from the speed-information generator unit 10 based on a presumption that the train 1 is in an accelerating condition at the current acceleration 113 (α3=3.50 [km/h/s]) during the idle running time period (S406), and to generate the braking instruction profile 108 based on the target deceleration profile 109 (S408).

When the notch input information 115 indicates in S404 that the power running notch is not input into any one of the stages, the on-train computing device 6 determines through the acceleration estimating unit 18 that the acceleration of the train 1 is "absent", and outputs the current train acceleration 113 of the train 1 as α=0 [km/h/s] (S405).

The on-train computing device 6 causes the profile calculating unit 15 to calculate the travel distance 110 and the speed change 111 based on the current speed 105 from the speed-information generator unit 10 based on a presumption that the train 1 is in a coasting condition at the current acceleration 113 (α=0 [km/h/s]) during the idle running time period (S407), and to generate the braking instruction profile 108 based on the target deceleration profile 109 (S408).

Next, the on-train computing device 6 causes the speed checking unit 16 to obtain a speed corresponding to the current train position 104 based on the braking instruction profile 108, and to compare the obtained speed with the current speed 105 (S409).

In S409, when the current speed 105 of the train 1 exceeds the speed obtained based on the braking instruction profile 108, the on-train computing device 6 causes the speed checking unit 16 to output the braking instruction 112 to the braking device 8 (S410).

In S409, when the current speed 105 of the train 1 does not exceed the speed obtained based on the braking instruction profile 108, the on-train computing device 6 repeats the processes from S402 to S409.

As explained above, according to the first embodiment, the on-train computing device 6 determines the presence/absence of the current acceleration 113 of the train 1 through the acceleration estimating unit 18, estimates the current acceleration 113 based on the train-car information 107 obtained from the train-car performance manager unit 14, and causes the profile calculating unit 15 to generate the braking instruction profile 108 based on a presumption that the train is running at the current acceleration 113 during the braking idle running time period when the train 1 is in an accelerating condition, and to generate the braking instruction profile 108 based on a presumption that the train car of the train 1 has no acceleration by the propulsion control of the train car itself when the train is in a coasting condition. Accordingly, even if the train is accelerating during the idle running, or is not accelerating, the braking instruction can be output in accordance with the running condition of the train, and thus the train can stop without overrunning the movement authority limit.

Moreover, in accordance with the geographical information of the current train position 104, such as a gradient, a curve, and/or a tunnel, constants corresponding to the gradient, the curve, and the air resistance are used through the acceleration estimating unit 18 for the calculation of the target deceleration profile 109 and the braking instruction profile 108, and thus a precise brake control is enabled.

According to the first embodiment, as the transponder type beacons, two kinds of beacons: the stopping position notifying beacon 3; and the position correction beacon 4 are used, but one transponder type beacon that serves as both stopping position notification and position correction can be used instead.

Moreover, according to the first embodiment, as the information input to the acceleration estimating unit 18, the notch input information 115 from the cab handle 5 is used, but the present invention is not limited to this case. An acceleration sensor may be additionally provided, and acceleration detected by the acceleration sensor may be directly input as the current acceleration 113 of the train 1. The current acceleration 113 can be calculated and used based on the train speed information from the speed-information generator unit 10. In this case, the brake control can be further improved.

Furthermore, according to the first embodiment, the acceleration estimating unit 18 obtains the notch input information 115 for notifying of only the presence/absence of the notch inputting input from the cab handle 5, but the notch input information for notifying of the intensity (e.g., 1N to 3N) of the notch inputting may be obtained.

In this case, when the acceleration estimating unit 18 obtains the maximum acceleration (in FIG. 5, α1, α2, and α3 at 1N, 2N, and 3N, respectively) from the train-car information 107 in the train-car performance manager unit 14 in accordance with the intensity of the notch inputting, the profile calculating unit 15 can generate the braking instruction profile 108 using the current acceleration 113 in accordance with the intensity of the notch inputting, and thus a further precise brake control is enabled.

Second Embodiment

According to the train speed control apparatus 200 of the first embodiment, the explanation was given of the case in which the travel distance and the speed change 111 are calculated with the current acceleration 113 being as a constant value when the train 1 is in an accelerating condition during the braking idle running time period. According to the second embodiment, however, the explanation will be given of a case in which the calculation is performed using a value of acceleration in accordance with the speed of the train.

Figure 7:
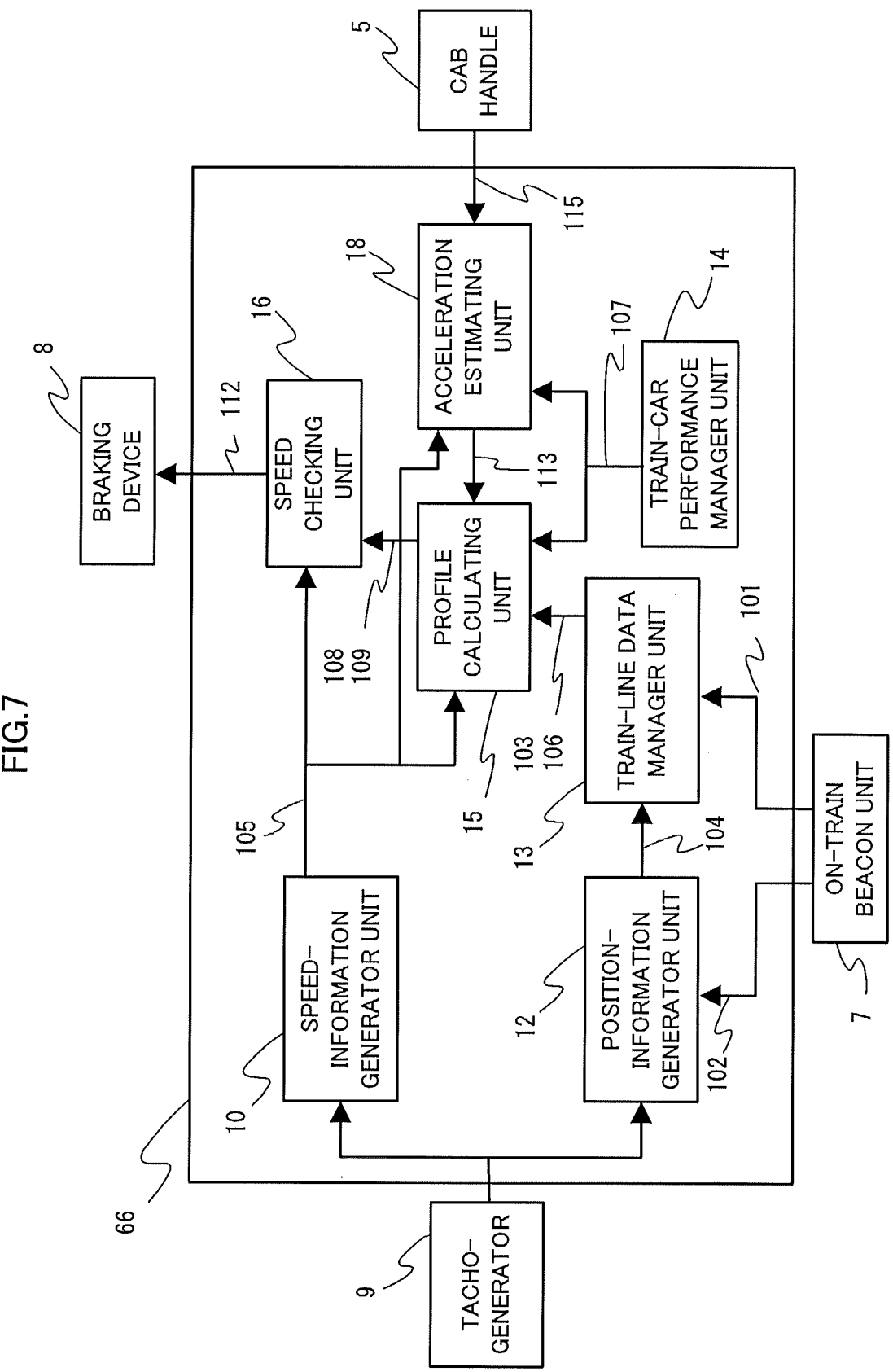
FIG. 7 is a block diagram showing a configuration of an on-train computing device of a train speed control apparatus according to a second embodiment of the present invention.

FIG. 7 is a block diagram showing a configuration of an on-train computing device 66 of a train speed control apparatus 201 according to the second embodiment of the present invention. In FIG. 7, the on-train computing device 66 employs a configuration in which the current speed 105 of the train 1 is directly input into the acceleration estimating unit 18 from the speed-information generator unit 10.

According to this configuration, when the acceleration estimating unit 18 determines that the acceleration of the train 1 is "present", the on-train computing device 66 obtains and outputs the current acceleration 113 in accordance with the current speed 105 of the train 1 at the notch inputting of the maximum intensity from the train-car information 107 in the train-car performance manager unit 14.

When, for example, the power running notch position N of the train 1 shown in FIG. 5 has the three stages of intensity from 1N to 3N as the train-car information 107, if the current speed 105 of the train 1 is 30 [km/h], the acceleration estimating unit 18 obtains and outputs the current train acceleration 113 that is α=3.50 [km/h/s] from the train-car information 107 based on the train performance data (see FIG. 6B) when the notch inputting is 3N.

Moreover, when the current speed 105 of the train 1 is 65 [km/h], the acceleration estimating unit 18 obtains and outputs the current train acceleration 113 that is α=1.33 [km/h/s], from the train-car information 107.

The profile calculating unit 15 calculates the travel distance 110 and the speed change 111 based on the values of the current speed 105 of the train 1 and the current acceleration 113 obtained in accordance with the current speed 105 of the train 1, and generates the braking instruction profile 108.

In general, the acceleration of a train is controlled so as to be constant up to a certain speed, and if it exceeds the certain speed, the acceleration becomes inversely proportional to the square of the speed. Hence, the acceleration estimating unit performs the determination on the excess of the braking instruction profile based on the characteristic of the train, and the acceleration in accordance with the speed, thereby enabling a further precise train control.

The other configurations and operations are similar to those of the first embodiment, the corresponding part will be denoted by the same reference numeral, and the explanation thereof will be omitted.

As explained above, according to the second embodiment, the on-train computing device 66 causes the acceleration estimating unit 18 to obtain the current acceleration 113 in accordance with the current speed 105 of the train 1 at the maximum intensity of the notch inputting from the train-car information 107, and generates the braking instruction profile 108 based on the current acceleration 113, thereby enabling a further precise brake control.

According to the second embodiment, the acceleration estimating unit 18 outputs the notch input information 115 notifying of only the presence/absence of the notch inputting input from the cab handle 5, but the notch input information may notify the intensity (e.g., 1N to 3N) of the notch inputting.

In this case, the acceleration estimating unit 18 obtains the maximum acceleration (in FIG. 5, α1, α2, and α3 at 1N, 2N, and 3N, respectively) from the train-car information 107 in the train-car performance manager unit 14 in accordance with the intensity of the notch inputting, and thus the profile calculating unit 15 can generate the braking instruction profile 108 based on the current train acceleration 113 in accordance with the intensity of the notch inputting, thereby enabling a further precise brake control.

Third Embodiment

According to the first embodiment, the explanation was given of the case in which when the train 1 passes through over the stopping position notifying beacon 3, the train speed control apparatus 200 causes the on-train beacon unit 7 to obtain the movement authority limit from the stopping position notifying beacon 3. According to a third embodiment, however, the explanation will be given of a case in which the movement authority limit is obtained through a wireless communication.

Figure 8:
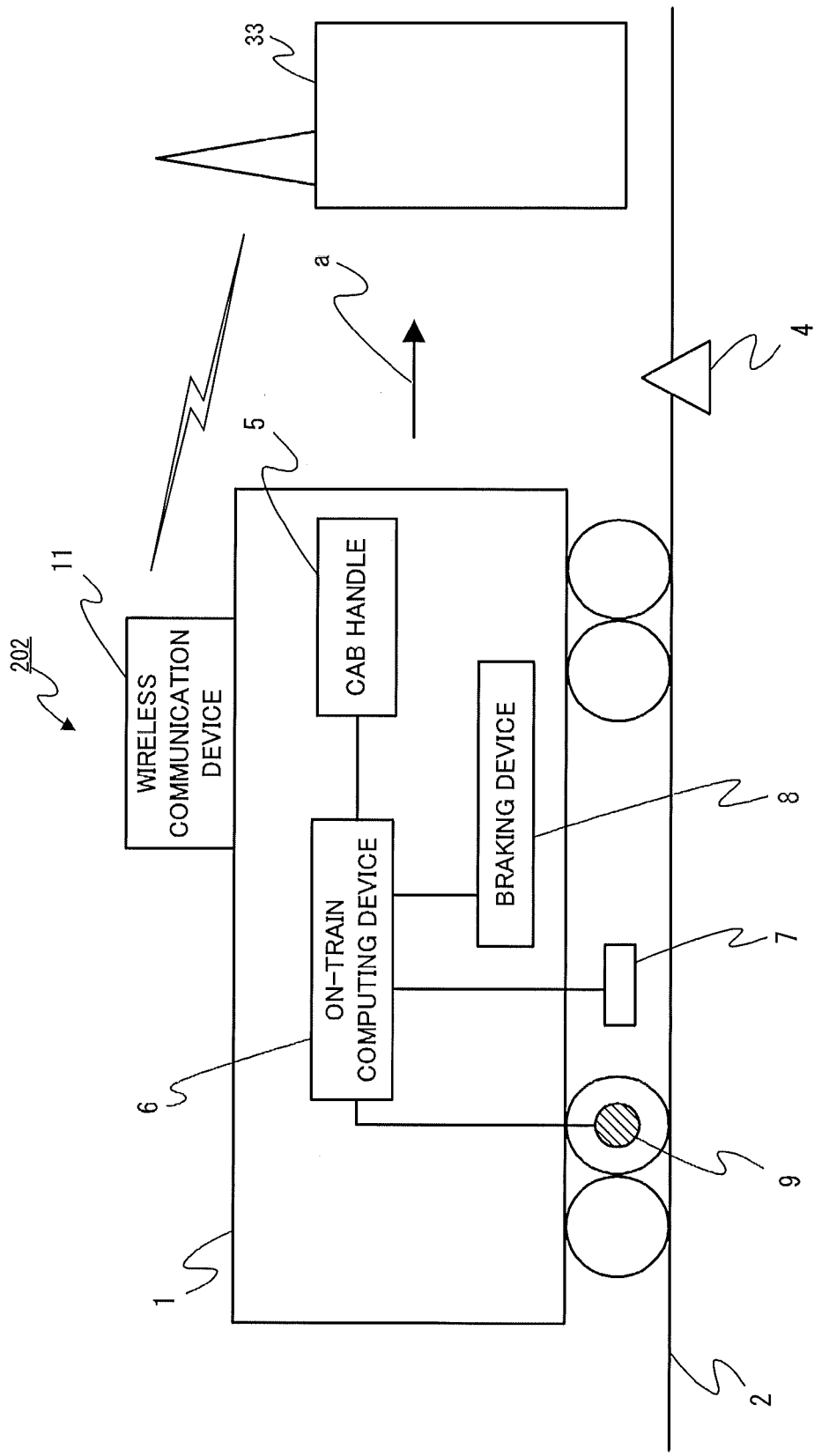
FIG. 8 is a configuration diagram showing a configuration of a train speed control apparatus according to a third embodiment of the present invention.

FIG. 8 is a configuration diagram showing a whole configuration of a train speed control apparatus according to the third embodiment of the present invention.

In FIG. 8, a train speed control apparatus 202 employs the configuration of the train speed control apparatus 200 of the first embodiment that is further added with an on-train wireless communication device 11. The on-train wireless communication device 11 is always notified of the movement authority limit 101 from a ground wireless base station 33 provided at a railroad, etc., of the train.

Figure 9:
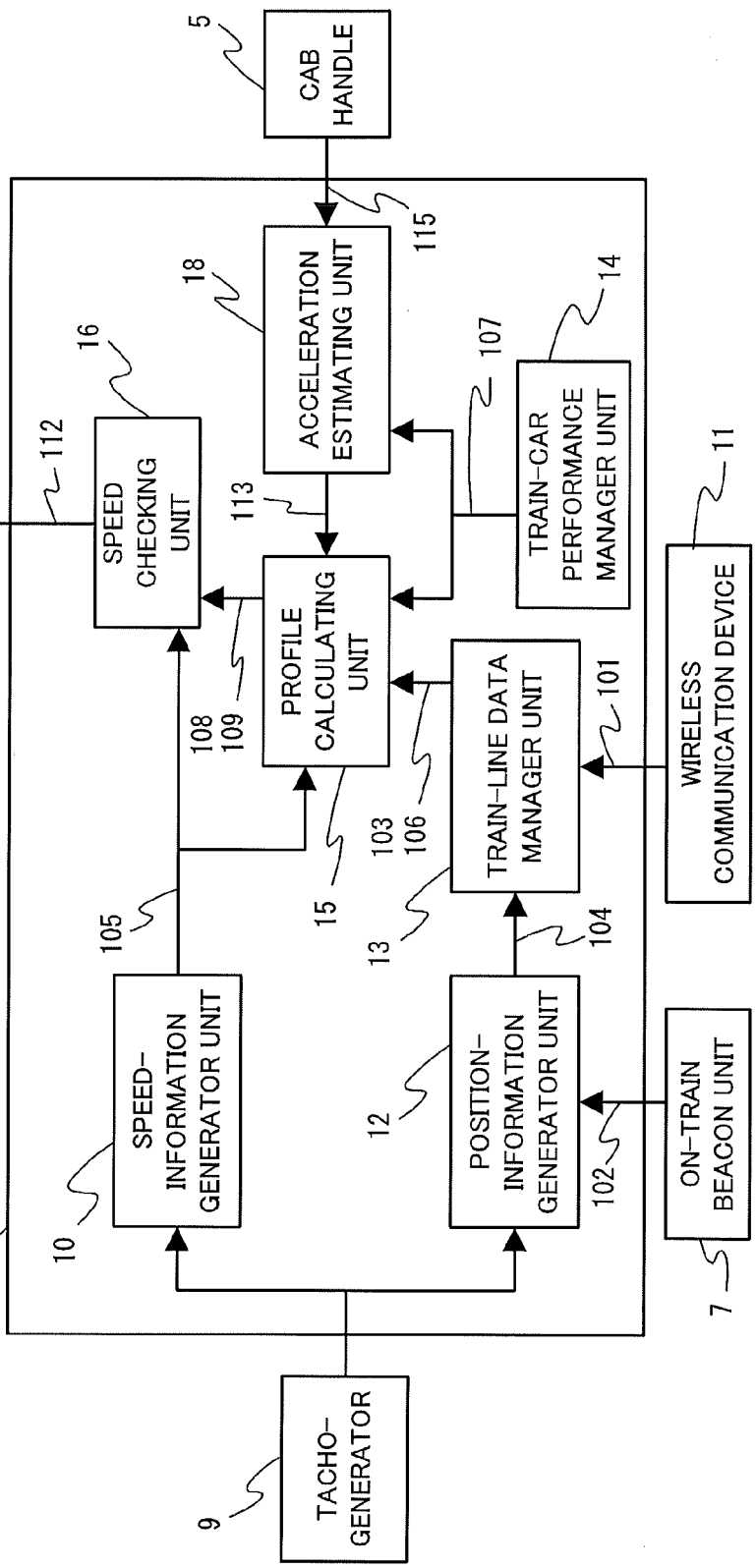
FIG. 9 is a block diagram showing a configuration of an on-train computing device of the train speed control apparatus according to the third embodiment of the present invention.

FIG. 9 is a block diagram showing a configuration of the on-train computing device 6 of the train speed control apparatus 202 according to the third embodiment of the present invention. In FIG. 9, the on-train computing device 6 causes the train-line data manager unit 13 to obtain the movement authority limit 101 notified from the on-train wireless communication device 11.

According to such a configuration, the train speed control apparatus 202 can always obtain the movement authority limit 101 from the ground wireless base station 33 through the on-train wireless communication device 11, thereby enabling a further precise brake control.

Moreover, when the position of a preceding train ahead of the local train is obtained as the movement authority limit 101, even if the preceding train ahead of the local train is moving, the position of the preceding train ahead of the local train can be always obtained, and the running of the train can be controlled without any collision with the preceding train ahead of the local train.

The other configurations and operations are similar to those of the first embodiment, the corresponding part will be denoted by the same reference numeral, and the explanation thereof will be omitted.

As explained above, according to the third embodiment, the on-train computing device 6 always obtains the movement authority limit 101 from the ground wireless base station 33 through the on-train wireless communication device 11, thereby enabling a further precise brake control.

Moreover, the position of the preceding train ahead of the local train is obtained as the movement authority limit 101. Accordingly, even if the preceding train ahead of the local train is moving, the position of the preceding train ahead of the local train can be always obtained, and thus the running of the train can be controlled without any collision with the preceding train ahead of the local train.

According to the third embodiment, the explanation was given of the case in which the movement authority limit 101 is obtained from the ground wireless base station 33, but the present invention is not limited to this case. For example, as means for notifying of the movement authority limit 101 instead of the ground wireless base station 33, transmitter means may be employed which transmits the positional information of the movement authority limit 101 through the track 2 where the train 1 is present, and which receives train position information transmitted through the track 2 by field connection and by providing an antenna of the on-train wireless communication device 11 at the side of the train 1 right above the track 2 at the head of the train 1.

DESCRIPTION OF REFERENCE NUMERALS

1 Train
2 Track
5 Cab handle
6, 66 On-train computing device
7 On-train beacon unit
8 Braking device
10 Speed-information generator unit
12 Position-information generator unit
11 On-train wireless communication device
13 Train-line data manager unit
14 Train-car performance manager unit
15 Profile calculating unit
16 Speed checking unit
18 Acceleration estimating unit
33 Ground wireless base station
101 Movement authority limit
103 Remaining travel distance
104 Current train position
105 Current speed
106 Geographical information
107 Train-car information
108 Braking instruction profile
109 Target deceleration profile 110 Travel distance
111 Speed change
112 Braking instruction
113 Current acceleration
115 Notch input information
200, 201, 202 Train speed control apparatus

The invention claimed is:

1. A train speed control apparatus comprising:
a receiver unit that receives a current position of a running train and train position information including a target position;
a speed obtaining unit that obtains a current speed of the train;
an acceleration estimating unit that estimates a current acceleration of the train;
a braking device that controls a brake of the train in response to a braking instruction;
a memory unit that stores train-car information including a stopping distance in accordance with a speed of the train;
a computing unit which generates a target deceleration profile based on a remaining travel distance to the target position obtained from the train position information and the stopping distance in accordance with the current speed obtained from the train-car information, and which generates a braking instruction profile by computing a travel distance of the train during an idle running time period of the brake in accordance with the current acceleration obtained by the acceleration estimating unit and a speed change based on the target deceleration profile when the braking instruction is output; and
a speed checking unit that outputs the braking instruction to the braking device when the current speed exceeds a speed at the current position in the braking instruction profile.

2. The train speed control apparatus according to claim 1, wherein the memory unit further stores, as the train-car information, an acceleration in accordance with the current speed of the train at an input position of a power running notch.

3. The train speed control apparatus according to claim 2, wherein
the acceleration estimating unit
determines whether the train is in an accelerating condition or a coasting condition in accordance with a power running instruction when the braking instruction is output,
estimates the current acceleration based on the train-car information when determining that the train is in the accelerating condition, and
estimates that the current acceleration is zero when determining that the train is in the coasting condition.

4. The train speed control apparatus according to claim 3, wherein when determining that the train is in the accelerating condition,
the acceleration estimating unit
obtains, from the train-car information, a maximum acceleration at an input position of the power running notch that makes the acceleration maximum, and
estimates the maximum acceleration as the current acceleration of the train when the braking instruction is output.

5. The train speed control apparatus according to claim 3, wherein when determining that the train is in the accelerating condition,
the acceleration estimating unit
obtains, from the train-car information, an acceleration in accordance with the current speed of the train at an input position of the power running notch that makes the acceleration maximum when the braking instruction is output, and
estimates the obtained acceleration as the current acceleration of the train when the braking instruction is output.

6. The train speed control apparatus according to claim 1, wherein
the memory unit further stores
a gradient, a curve, and a position of a tunnel on a train line where the train runs as geographical information, and
an acceleration constant of the train in accordance with the geographical information as the train-car information.

7. The train speed control apparatus according to claim 6, wherein the computing unit corrects the target deceleration profile in accordance with the acceleration constant based on the geographical information of a remaining travel interval obtained from the memory unit in accordance with the current position of the train.

8. The train speed control apparatus according to claim 6, wherein the computing unit corrects the travel distance of the train and the speed change in accordance with the acceleration constant based on the geographical information of the remaining travel interval obtained from the memory unit in accordance with the current position of the train to generate the braking instruction profile.

9. The train speed control apparatus according to claim 1, wherein the receiver unit always receives the target position wirelessly from a ground transmitter device or a transmitter device of a preceding train, the target position being a position of the preceding train running ahead of the train.

10. A train speed control method comprising steps, using a train speed control apparatus to perform the steps of:
obtaining a current position of a running train and train position information including a target position;
generating a target deceleration profile based on a remaining travel distance to the target position obtained from the train position information and a stopping distance in accordance with a current speed obtained from train-car information of the train;
computing, based on the target deceleration profile, a travel distance of the train and a speed change in an idle running time period of a brake in accordance with a current acceleration obtained when a braking instruction is output to generate a braking instruction profile; and
outputting the braking instruction when the current speed exceeds a speed at the current position in the braking instruction profile.

11. The train speed control method according to claim 10, comprising:
determining whether the train is in an accelerating condition or a coasting condition in accordance with a power running instruction when the braking instruction is output,
estimating the current acceleration based on the train-car information when determining that the train is in the accelerating condition, and
estimating that the current acceleration is zero when determining that the train is in the coasting condition.

12. The train speed control method according to claim 11, wherein when determining that the train is in an accelerating condition, the method comprises:
obtaining, from the train-car information, a maximum acceleration at an input position of the power running notch that makes the acceleration maximum, and
estimating the maximum acceleration as the current acceleration of the train when the braking instruction is output.

13. The train speed control method according to claim 11, wherein when determining that the train is in an accelerating condition, the method comprises:

obtaining, from the train-car information, an acceleration in accordance with the current speed of the train at an input position of the power running notch that makes the acceleration maximum when the braking instruction is output, and estimating the obtained acceleration as the current acceleration of the train when the braking instruction is output.

* * * * *